(12) United States Patent
Wu (10) Patent No.: US 10,512,006 B2
(45) Date of Patent: Dec. 17, 2019

(54) DEVICE AND METHOD OF HANDLING A BEARER CHANGE IN DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 20 days.

(21) Appl. No.: 16/059,068

(22) Filed: Aug. 9, 2018

(65) Prior Publication Data

US 2019/0053111 A1  Feb. 14, 2019

Related U.S. Application Data

(60) Provisional application No. 62/544,001, filed on Aug. 11, 2017, provisional application No. 62/566,323, filed on Sep. 30, 2017.

(51) Int. Cl.
*H04W 36/00* (2009.01)
*H04W 76/27* (2018.01)
(Continued)

(52) U.S. Cl.
CPC ....... *H04W 36/0069* (2018.08); *H04W 76/15* (2018.02); *H04W 76/27* (2018.02); *H04W 88/06* (2013.01); *H04W 36/0033* (2013.01)

(58) Field of Classification Search
CPC . H04W 36/0069; H04W 88/06; H04W 76/15; H04W 76/27; H04W 36/0033
See application file for complete search history.

(56) References Cited

U.S. PATENT DOCUMENTS 10,455,456 B2 * 10/2019 Jang ..................... H04W 28/26
2015/0043492 A1 * 2/2015 Baek ..................... H04W 76/15
370/329

(Continued)

FOREIGN PATENT DOCUMENTS

EP        2 835 925 A1    2/2015
GB        2528913 A       2/2016
(Continued)

OTHER PUBLICATIONS

Search Report dated Dec. 21, 2018 for EP application No. 18188527.8, pp. 1~7.

(Continued)

*Primary Examiner* — Will W Lin
(74) *Attorney, Agent, or Firm* — Winston Hsu (57) ABSTRACT

A network comprising a first base station (BS) and a second BS is configured to execute instructions of the first BS transmitting a first radio resource control (RRC) message on a signaling radio bearer (SRB) to a communication device, wherein the first RRC message configures a data radio bearer (DRB); the first BS receiving a first RRC response message from the communication device on the SRB, in response to the first RRC message; the first BS receiving a first plurality of packet data convergence protocol (PDCP) Service Data Units (SDUs) associated to the DRB from the communication device; and the first BS performing a dual connectivity (DC) operation procedure for the communication device with the second BS to modify the DRB to be a secondary cell group (SCG) bearer or a split bearer.

10 Claims, 4 Drawing Sheets

(51) Int. Cl.
*H04W 76/15* (2018.01)
*H04W 88/06* (2009.01)

(56) References Cited

U.S. PATENT DOCUMENTS

| 2015/0215987 | A1* | 7/2015 | Kim | H04L 47/34 370/329 |
|---|---|---|---|---|
| 2015/0264562 | A1* | 9/2015 | Wu | H04W 12/04 380/270 |
| 2016/0212753 | A1* | 7/2016 | Wu | H04W 72/085 |
| 2016/0255675 | A1* | 9/2016 | Van Lieshout | H04L 1/1829 370/329 |
| 2016/0286412 | A1* | 9/2016 | Kim | H04W 28/02 |

FOREIGN PATENT DOCUMENTS

| WO | 2015/065080 | A1 | 5/2015 |
|---|---|---|---|
| WO | 2015/145255 | A2 | 10/2015 |
| WO | 2015/145255 | A3 | 11/2015 |

OTHER PUBLICATIONS

Ericsson, "PDCP reception algorithm", 3GPP TSG-RAN WG2 #98-AH, Tdoc R2-1707154, Jun. 27-29, 2017, Qingdao, P.R. of China, XP051301647, pp. 1-8.

3GPP TS 38.323 V0.2.0 (Aug. 2017), "3rd Generation Partnership Project; Technical Specification Group Radio Access Network; NR; Packet Data Convergence Protocol (PDCP) specification (Release 15)", XP051450225, pp. 1-27.

3GPP TS 37.340 V0.2.1 (Aug. 2017), "3rd Generation Partnership Project; Technical Specification Group Radio Access Network; Evolved Universal Terrestrial Radio Access (E-UTRA) and NR; Multi-connectivity; Stage 2 (Release 15)", XP051336704, pp. 1-43.

Huawei (rapporteur), "Summary of [97bis#12][NR] Bearer type change (Huawei)", 3GPP TSG-RAN WG2 NR Adhoc#2, R2-1707403, Jun. 27-29, 2017, Qingdao, China, XP051301892, pp. 1-27.

3GPP TS 37.340 V0.2.1 (Aug. 2017) Technical Specification 3rd Generation Partnership Project; Technical Specification Group Radio Access Network; Evolved Universal Terrestrial Radio Access (E-UTRA) and NR; Multi-connectivity; Stage 2 (Release 15); 3GPP R2-170808.

3GPP TS 37.340, "3rd Generation Partnership Project; Technical Specification Group Radio Access Network; Evolved Universal Terrestrial Radio Access (E-UTRA) and NR; Multi-connectivity; Stage 2 (Release 15)", V0.2.0, Jun. 2017, pp. 1-43.

3GPP TS 38.323, "3rd Generation Partnership Project; Technical Specification Group Radio Access Network; NR; Packet Data Convergence Protocol (PDCP) specification (Release 15)", V0.1.0, Jun. 2017, pp. 1-28.

LG Electronics Inc., "E-mail discussion summary of PDCP receive operation", 3GPP TSG-RAN WG2 NR AdHoc (R2-170xxxx), Qingdao, China, Jun. 27-29, 2017, pp. 1-25.

Office action dated May 20, 2019 for the Taiwan application No. 107128010, filing date Aug. 10, 2018, pp. 1-13.

* cited by examiner

DEVICE AND METHOD OF HANDLING A BEARER CHANGE IN DUAL CONNECTIVITY

CROSS REFERENCE TO RELATED APPLICATIONS

This application claims the benefits of U.S. Provisional Application No. 62/544,001 filed on Aug. 11, 2017, and U.S. Provisional Application No. 62/566,323 filed on Sep. 30, 2017, which are incorporated herein by reference.

BACKGROUND OF THE INVENTION

1. Field of the Invention

The present invention relates to a device and a method used in a wireless communication system, and more particularly, to a device and a method of handling a bearer change in dual connectivity.

2. Description of the Prior Art

In a new radio (NR) system, a UE may communicate with a gNB in a standalone or a non-standalone mode. The UE may communicate with the gNB in dual connectivity (DC) with an evolved Node-B (eNB) or another gNB. The UE may only communicate with the gNB without the DC. A bearer may be configured to the UE in the DC. It is still unknown how to process (e.g., receive) data, if a type of the bearer is changed. Accordingly, the UE cannot operate properly. Thus, it is important to define an operation for the UE in the situation to solve the problem.

SUMMARY OF THE INVENTION

The present invention therefore provides a method and related communication device for handling a bearer change in dual connectivity to solve the abovementioned problem.

A network comprising a first base station (BS) and a second BS comprises at least one storage device; and at least one processing circuit coupled to the at least one storage device. The at least one storage device stores, and the at least one processing circuit is configured to execute instructions of: the first BS transmitting a first radio resource control (RRC) message on a signaling radio bearer (SRB) to a communication device, wherein the first RRC message configures a data radio bearer (DRB); the first BS receiving a first RRC response message from the communication device on the SRB, in response to the first RRC message; the first BS receiving a first plurality of packet data convergence protocol (PDCP) Service Data Units (SDUs) associated to the DRB from the communication device; the first BS processing the first plurality of PDCP SDUs according to a first RX_NEXT, a first RX_DELIV and a first RX_REORD which are associated to the DRB; the first BS performing a dual connectivity (DC) operation procedure for the communication device with the second BS to modify the DRB to be a secondary cell group (SCG) bearer or a split bearer; the first BS transmitting a second RRC message on the SRB to the communication device in response to the DC operation procedure; the first BS receiving a second RRC response message responding to the second RRC message on the SRB from the communication device; the first BS transmitting at least one of the first RX_NEXT, the first RX_DELIV and the first RX_REORD to the second BS; the second BS receiving a second plurality of PDCP SDUs associated to the DRB from the communication device; and the second BS processing the second plurality of PDCP SDUs according to the at least one of the first RX_NEXT, the first RX_DELIV and the first RX_REORD.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
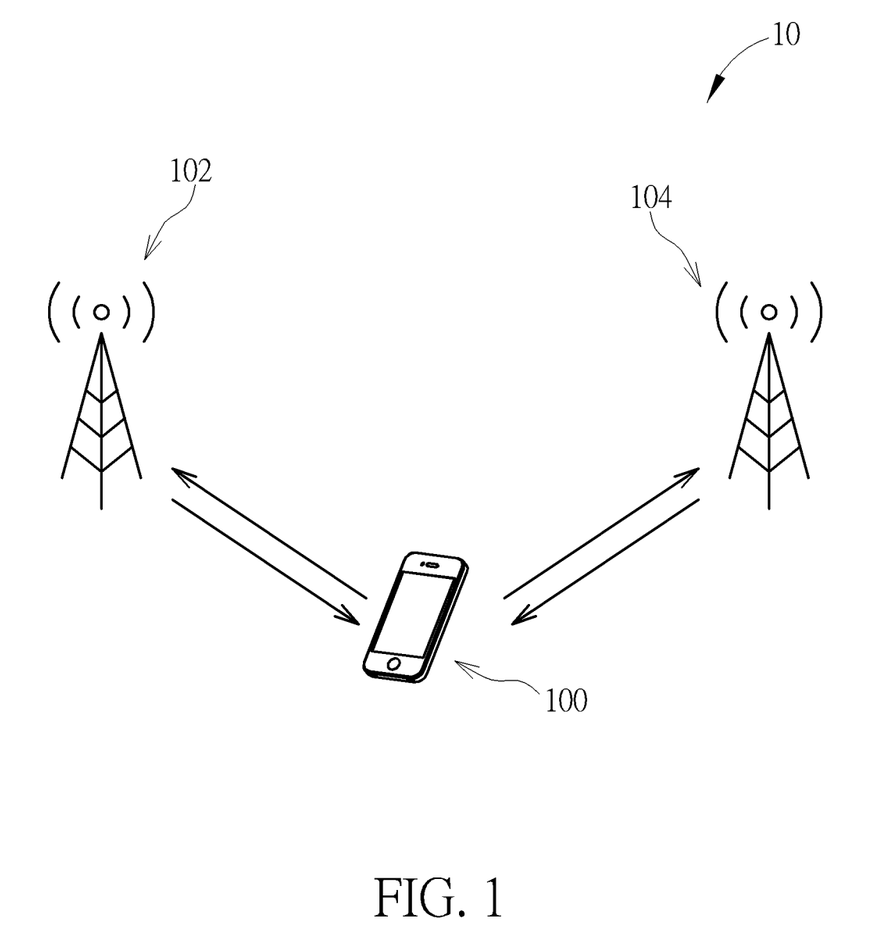
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

The communication device 100 may be configured to communicate with the BS 102 only, i.e., not in dual connectivity (DC). The BS 102 may command the communication device 100 to hand over to the BS 104.

The communication device 100 may be configured to communicate with the BSs 102 and 104 simultaneously according to the DC configured to the communication device 100. In one example, the communication device 100 receives protocol data units (PDUs) from the BS 102 at one carrier frequency and the BS 104 at another carrier frequency, or the communication device 100 transmits PDUs to the BS 102 at one carrier frequency and/or the BS 104 at another carrier frequency. In one example, the communication device 100 receives PDUs from at least one cell of the BS 102 and/or at least one cell of the BS 104. Similarly, the communication device 100 transmits the PDUs to at least one cell of the BS 102 and/or at least one cell of the BS 104. For the UE in the DC with the BSs 102 and 104, one of the BSs 102 and 104 is a master node (MN) and the other BS is a secondary node (SN).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 are/is a receiver(s), and for a downlink (DL), the BS(s) 102 and/or 104 are/is a transmitter(s) and the communication device 100 is a receiver.

Figure 2:
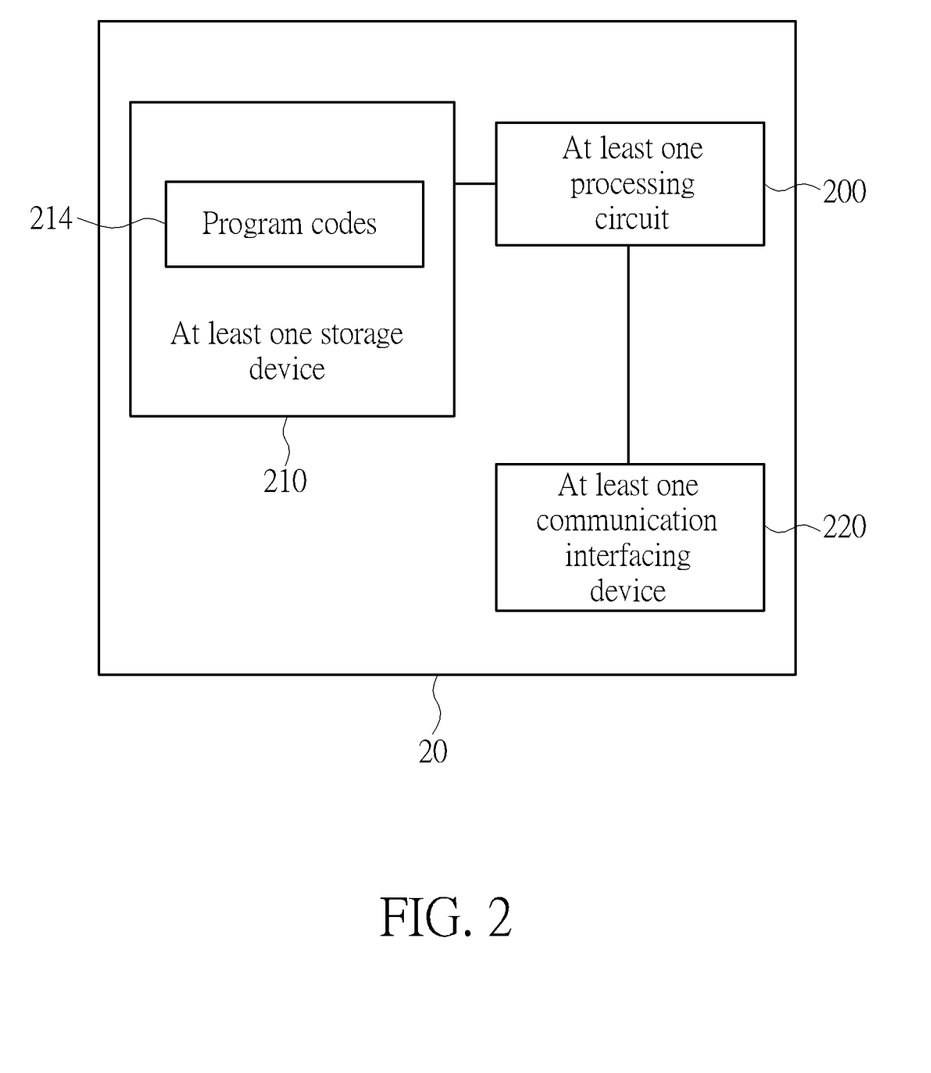
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the examples.

In one example, the UE connecting to the MN has a first signalling radio bearer (SRB), and the MN transmits a measurement configuration on the first SRB to the UE. In detail, the UE transmits a measurement report on the first SRB to the MN according to the measurement configuration. The MN initiates a SN Addition procedure (e.g., SgNB Addition procedure) with the SN for the UE in response to the measurement report. The MN configures the UE to connect to the SN in response to the SN Addition procedure by transmitting a radio resource control (RRC) message on the first SRB to the UE. The RRC message includes a SN configuration (e.g., SCG configuration) for the UE to connect to the SN. According to the RRC message, the UE may setup a radio bearer (RB).

A protocol architecture may be used for illustrating that a use of a RB depends on how the RB is setup. A RB may be a data RB (DRB) for data transmission and/or data reception on a user plane, and a SRB for data transmission and/or data reception on a control plane. A DRB configuration may include at least one of a DRB identity, a packet data convergence protocol (PDCP) configuration, a radio link control (RLC) configuration, a logical channel identity and a logical channel configuration (e.g., priority and/or logical channel group). A SRB configuration may include a SRB identity, the RLC configuration and the logical channel configuration. In the DC, there may be three types of RB: a master cell group (MCG) bearer, a secondary cell group (SCG) bearer and a split bearer. The MCG bearer may utilize radio protocol(s) located at the MN, to use radio resources (e.g., time resources and/or frequency resources) of the MN. The SCG bearer may utilize radio protocol(s) located at the SN, to use radio resources (e.g., time resources and/or frequency resources) of the SN. The split bearer may utilize the radio protocol(s) located at both the MN and the SN, to use the radio resources of the MN and the SN. The split bearer may be a MCG split bearer or a SCG split bearer. A DRB may be the MCG bearer, the SCG bearer or the split bearer. A SRB may be configured as the MCG bearer or the split bearer.

In one example, a BS (e.g., the BS 102 or the BS 104) may use the following state variables to communicate PDCP Service Data Units (SDUs) associated to a DRB or a SRB with a communication device (e.g., the communication device 100).

TX_NEXT, which indicates a COUNT value of a next PDCP SDU to be transmitted. The initial value of TX_NEXT is 0.

RX_NEXT, which indicates a COUNT value of a next PDCP SDU expected to be received. The initial value of RX_NEXT is 0.

RX_DELIV, which indicates a COUNT value of a first PDCP SDU not delivered to upper layers, but still waited for. The initial value of RX_DELIV is 0.

RX_REORD, which indicates a COUNT value following a COUNT value associated with a PDCP Data PDU which triggered/triggers t-Reordering to be started or restarted.

Figure 3:
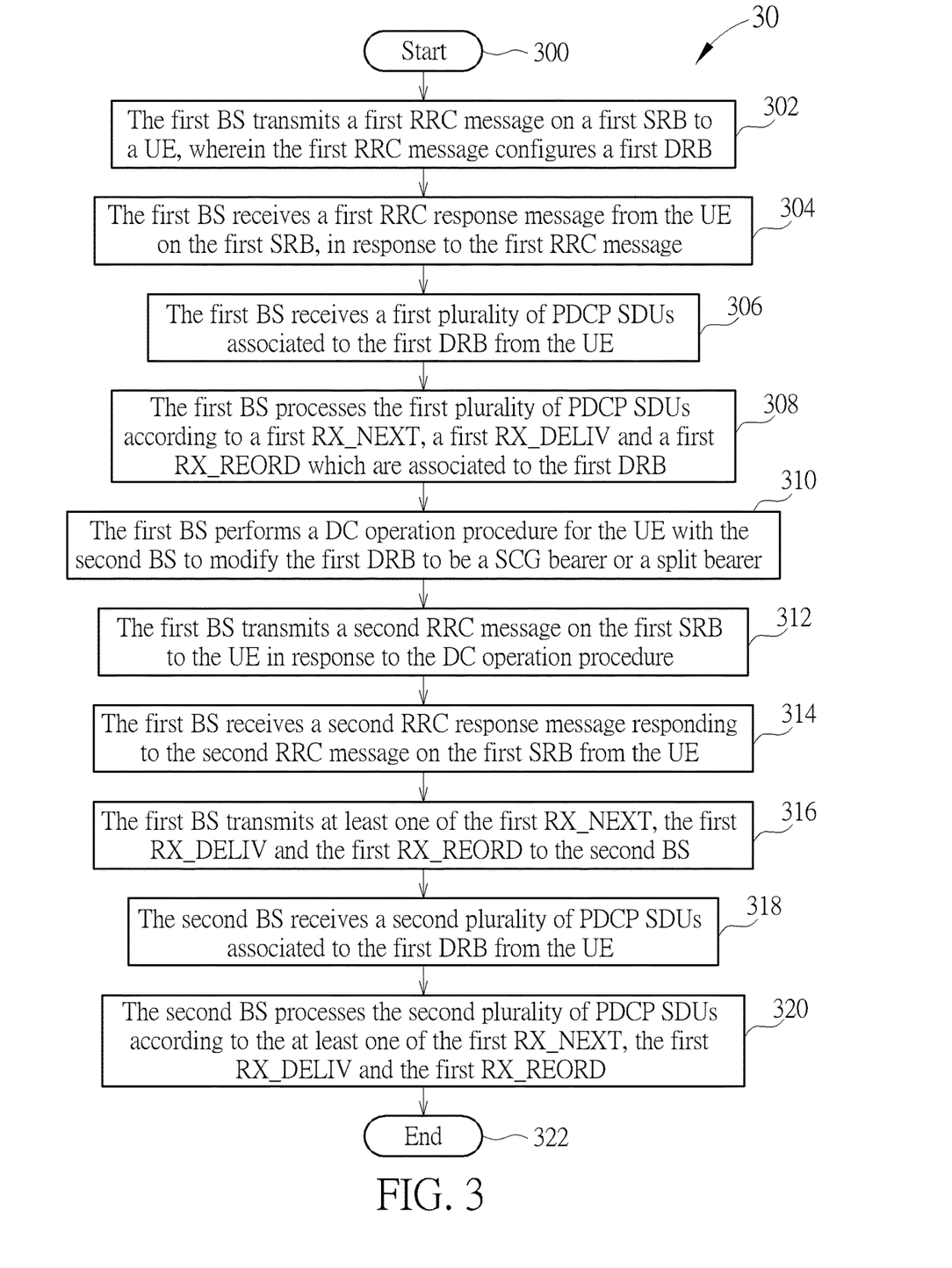
FIG. 3 is a flowchart of a process according to an example of the present invention.

A process 30 in FIG. 3 may be utilized in a network comprising a first BS (e.g., the BS 102) and a second BS (e.g., the BS 104), and includes the following steps:

Step 300: Start.

Step 302: The first BS transmits a first RRC message on a first SRB to a UE, wherein the first RRC message configures a first DRB.

Step 304: The first BS receives a first RRC response message from the UE on the first SRB, in response to the first RRC message.

Step 306: The first BS receives a first plurality of PDCP SDUs associated to the first DRB from the UE.

Step 308: The first BS processes the first plurality of PDCP SDUs according to (e.g., by using) a first RX_NEXT, a first RX_DELIV and a first RX_REORD which are associated to the first DRB.

Step 310: The first BS performs a DC operation procedure for the UE with the second BS to modify the first DRB to be a SCG bearer or a split bearer.

Step 312: The first BS transmits a second RRC message on the first SRB to the UE in response to the DC operation procedure.

Step 314: The first BS receives a second RRC response message responding to the second RRC message on the first SRB from the UE.

Step 316: The first BS transmits at least one of the first RX_NEXT, the first RX_DELIV and the first RX_REORD to the second BS.

Step 318: The second BS receives a second plurality of PDCP SDUs associated to the first DRB from the UE.

Step 320: The second BS processes the second plurality of PDCP SDUs according to (e.g., by using) the at least one of the first RX_NEXT, the first RX_DELIV and the first RX_REORD.

Step 322: End.

In one example, the first BS transmits the at least one of the first RX_NEXT (value), the first RX_DELIV (value) and the first RX_REORD (value) to the second BS in response to the DC operation procedure, in response to the second RRC response message or when/after receiving the second RRC response message.

In one example, the first BS updates the first RX_NEXT, the first RX_DELIV and the first RX_REORD to other values (i.e., not the initial values), when processing the first plurality of PDCP Data PDUs.

In one example, the first BS transmits all of the at least one of the first RX_NEXT (value), the first RX_DELIV (value) and the first RX_REORD (value) to the second BS.

In one example, the first BS does not transmit one of the at least one of the first RX_NEXT (value), the first RX_DELIV (value) and the first RX_REORD (value) to the second BS. For example, the first BS may not transmit the first RX_REORD to the second BS. In this case, the second BS may set a second RX_REORD to the first RX_NEXT, and may use the second RX_REORD to process the second plurality of PDCP SDUs. For example, the first BS may not transmit the first RX_NEXT to the second BS. The second BS may set a second RX_NEXT to the first RX_REORD or the first RX_DELIV, and may use the second RX_NEXT to process the second plurality of PDCP SDUs.

In one example, the first BS transmits status information of other PDCP SDU(s) associated with COUNT value(s) or PDCP sequence number(s) (SN(s)) equal to or after the first RX_DELIV to the second BS. In one example, the status information indicates COUNT value(s) of the other PDCP SDU(s) which are missing. In one example, the status information is a bitmap which indicates which PDCP SDU(s) is missing and which PDCP SDU(s) is correctly received in the receiving PDCP entity. A bit position of a Nth bit in the bitmap is N, i.e., the bit position of the first bit in the bitmap is 1.

In one example, the first BS does not transmit the first RX_NEXT to the second BS. The second BS may set a second RX_NEXT to a COUNT value derived from the first RX_DELIV and the status information, and may use the second RX_NEXT to process the second plurality of PDCP SDUs. The COUNT value may be derived from a COUNT value of the last PDCP SDU of the other PDCP SDU(s) indicated in the status information. For example, the COUNT value of the last PDCP SDU may be derived from the first RX_DELIV and the position of the last bit with a value of 1 in the bitmap.

Figure 4:
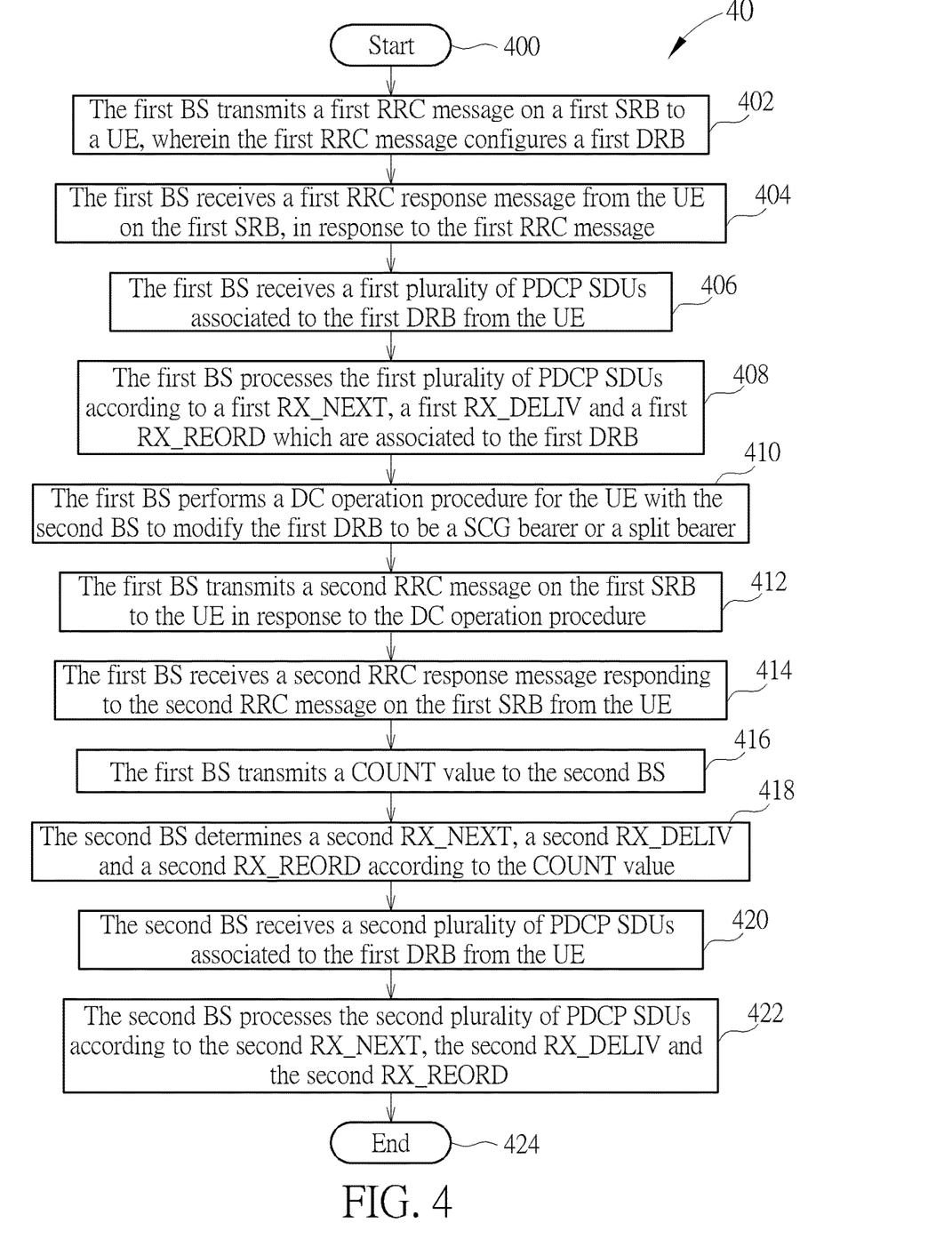
FIG. 4 is a flowchart of a process according to an example of the present invention.

A process 40 in FIG. 4 may be utilized in a first BS (e.g., the BS 102) to communicate with a second BS (e.g., the BS 104), and includes the following steps:

Step 400: Start.

Steps 402-414: The same as Steps 302-314.

Step 416: The first BS transmits a COUNT value (e.g., of a PDCP SDU) to the second BS.

Step 418: The second BS determines a second RX_NEXT, a second RX_DELIV and a second RX_REORD associated to the first DRB according to the COUNT value.

Step 420: The second BS receives a second plurality of PDCP SDUs associated to the first DRB from the UE.

Step 422: The second BS processes the second plurality of PDCP SDUs according to (e.g., by using) the second RX_NEXT, the second RX_DELIV and the second RX_REORD.

Step 424: End.

In one example, the first BS updates the first RX_NEXT, the first RX_DELIV and the first RX_REORD to other values (i.e., not initial values), when processing the first plurality of PDCP SDUs.

In one example, the first BS transmits the COUNT value to the second BS in response to the DC operation procedure, in response to the second RRC response message or when/after receiving the second RRC response message.

In one example, the PDCP SDU in Step 416 is a missing PDCP SDU, i.e., the first BS does not receive the PDCP SDU. The first BS may detect/determine the missing PDCP SDU from the first plurality of PDCP SDUs. For example, the first plurality of PDCP SDUs has a first SDU and a second PDCP SDU. A sequence number of the first PDCP SDU is M, and a sequence number of the second PDCP SDU is N (>M). Then, the first BS detects/determines the missing PDCP SDU which is a PDCP SDU with a sequence number=M+1, . . . or N−1, since the UE does not receive the PDCP SDU(s) which has the sequence number=M+1, . . . , N−1. The PDCP SDU may be the first missing PDCP SDU.

In one example, the second BS sets the second RX_NEXT, the second RX_DELIV and the second RX_REORD to the COUNT value.

In one example, the first BS transmits status information of other PDCP SDU(s) to the second BS. In one example, the status information includes COUNT values of the other PDCP SDU(s) which are missing. In one example, the status information is a bitmap which indicates which PDCP SDU(s) is missing and which PDCP SDU(s) is correctly received in a PDCP entity associated to the first DRB. A bit position of a Nth bit in the bitmap is N, i.e., the bit position of the first bit in the bitmap is 1.

In one example, the second BS sets the second RX_NEXT, the second RX_DELIV and the second RX_REORD according to/derived from the COUNT value of the first missing PDCP SDU and the status information. For example, the second BS may set the RX_DELIV to the COUNT value. For example, the second BS may set the second RX_NEXT to a COUNT value of the last missing PDCP SDU derived from the COUNT value of the first missing PDCP SDU and the status information. For example, the second BS may set the second RX_NEXT to (a first COUNT value+1), wherein the first COUNT value is a COUNT value of the last PDCP SDU received by the first BS as indicated in the status information. For example, the first COUNT value may be derived from the COUNT value of the first missing PDCP SDU+the position of the last bit with a value of 1 in the bitmap. The second BS may set the second RX_REORD in the same way as setting the second RX_NEXT or the second RX_DELIV as described above. That is, the second RX_REORD and the second RX_NEXT are set to the same value, or the second RX_REORD and the second RX_DELIV are set to the same value.

The following examples may be applied to the processes 30 and 40.

In one example, the first BS performs the DC operation procedure for the UE with the second BS to modify the first DRB to be the SCG bearer or the split bearer (i.e., a SCG split bearer) from a MCG bearer or a MCG split bearer.

In one example, the first RRC message configures the first DRB to be the MCG bearer. The second RRC message may configure the first DRB to be the SCG bearer or the split bearer from the MCG bearer. The second RRC message may implicitly or explicitly indicate a bearer type change from the MCG bearer to the SCG bearer or the split bearer.

In one example, the first RRC message configures the first DRB to be a split bearer. The first BS configures the split bearer as the MCG split bearer. The second RRC message may not indicate a bearer type change for the split bearer. In this case, the first BS may configure the split bearer to be the MCG split bearer at the beginning, and then may configure the split bearer to be a SCG split bearer with the second BS in response to the DC operation procedure. The UE may or may not know that the split bearer is the MCG split bearer or the SCG split bearer.

In one example, the UE in the DC with the first BS and the second BS transmits the second plurality of PDCP SDUs associated to the first DRB to the second BS, in response to the second RRC message or when the first DRB is modified to be the SCG bearer or the split bearer.

In one example, the second BS starts a t-Reordering timer associated to the first DRB in response to the DC operation procedure, in response to a SN (e.g., SgNB) Reconfiguration Complete message received from the first BS or when detecting a transmission from the UE. The transmission may be a PDCP Data PDU (e.g., the first PDCP Data PDU associated to the first DRB when the first DRB is changed to be the SCG bearer or the split bearer), a random access (RA) preamble, a medium access control (MAC) control element (CE), a physical UL control channel (PUCCH) transmission or a physical UL shared channel (PUSCH) transmission.

In one example, the first BS processes a third plurality of PDCP SDUs associated to the first DRB by using a first TX_NEXT to transmit the third plurality of PDCP SDUs to the UE. The first BS updates the first TX_NEXT, when processing the third plurality of PDCP SDUs to be transmitted. Then, the first BS may transmit the first TX_NEXT to the second BS in response to the DC operation procedure. The second BS may transmit a fourth plurality of PDCP SDUs associated to the first DRB to the UE according to (e.g., by using) the first TX_NEXT.

In one example, the first BS transmits a third RRC message on the first SRB to the UE, wherein the third RRC message configures a second DRB to be the MCG bearer. The first BS receives a third RRC response message from the UE on the first SRB, in response to the third RRC message. The first BS receives a fifth plurality of PDCP SDUs associated to the second DRB from the UE. The first BS processes the fifth plurality of PDCP SDUs according to (e.g., by using) a third RX_NEXT, a third RX_DELIV and a third RX_REORD which are associated to the second DRB. The first BS performs a DC operation procedure for the UE with the second BS to modify the second DRB to a SCG bearer or a split bearer from the MCG bearer. The first BS transmits a fourth RRC message on the first SRB to the UE in response to the DC operation procedure, wherein the fourth RRC message configures the second DRB to be the SCG bearer or the split bearer from the MCG bearer. The first BS receives a fourth RRC response message responding to the fourth RRC message on the first SRB from the UE. The first BS does not transmit the third RX_NEXT, the third RX_DELIV and the third RX_REORD to the second BS in response to the DC operation procedure. The second BS receives a sixth plurality of PDCP SDUs associated to the second DRB from the UE. The second BS sets (e.g., creates) a fourth RX_NEXT, a fourth RX_DELIV and a fourth RX_REORD to (with) initial values in response to the DC operation procedure. The second BS processes the sixth plurality of PDCP SDUs according to (e.g., by using) the fourth RX_NEXT, the fourth RX_DELIV and the fourth RX_REORD. The second BS sets (e.g., creates) a fourth TX_NEXT to (with) an initial value in response to the DC operation procedure. The second BS transmits a seventh plurality of PDCP SDUs according to (e.g., by using) the fourth TX_NEXT. If the same DC operation is performed for changing the first DRB and the second DRB from the MCG bearers to the SCG bearers or the split bearers, the second RRC message and the fourth RRC message are the same message. Otherwise, the second RRC message and the fourth RRC message are different messages.

In one example, the first BS maintains a fifth RX_NEXT, a fifth RX_DELIV and a fifth RX_REORD associated to the first SRB for receiving the RRC messages on the first SRB. The first BS does not transmit the fifth RX_NEXT, the fifth RX_DELIV and the fifth RX_REORD to the second BS in response to the DC operation procedure.

In one example, the first BS is a master evolved Node-B (eNB) or a master gNB. The second BS may be a secondary gNB or a secondary eNB. The first SRB may be a SRB1.

In one example, the first DRB is an acknowledged mode (AM) DRB (e.g., configured to use RLC AM), and the second DRB is an unacknowledged mode (UM) DRB (e.g., configured to use RLC UM). The first SRB may use the RLC AM.

In one example, a RRC message is a RRC Reconfiguration message, and a RRC response message is a RRC Reconfiguration Complete message.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and related communication device for handling a bearer change in DC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) and a second BS, comprising:
at least one storage device; and
at least one processing circuit, coupled to the at least one storage device, wherein the at least one storage device stores, and the at least one processing circuit is configured to execute instructions of:
the first BS transmitting a first radio resource control (RRC) message on a signaling radio bearer (SRB) to a communication device, wherein the first RRC message configures a data radio bearer (DRB);
the first BS receiving a first RRC response message from the communication device on the SRB, in response to the first RRC message;
the first BS receiving a first plurality of packet data convergence protocol (PDCP) Service Data Units (SDUs) associated to the DRB from the communication device;
the first BS processing the first plurality of PDCP SDUs according to a first RX_NEXT, a first RX_DELIV and a first RX_REORD which are associated to the DRB;
the first BS performing a dual connectivity (DC) operation procedure for the communication device with the second BS to modify the DRB to be a secondary cell group (SCG) bearer or a split bearer;
the first BS transmitting a second RRC message on the SRB to the communication device in response to the DC operation procedure;
the first BS receiving a second RRC response message responding to the second RRC message on the SRB from the communication device;
the first BS transmitting at least one of the first RX_NEXT, the first RX_DELIV and the first RX_REORD to the second BS;
the second BS receiving a second plurality of PDCP SDUs associated to the DRB from the communication device; and
the second BS processing the second plurality of PDCP SDUs according to the at least one of the first RX_NEXT, the first RX_DELIV and the first RX_REORD.

2. The network of claim 1, wherein the first BS transmits the at least one of the first RX_NEXT, the first RX_DELIV and the first RX_REORD to the second BS in response to the DC operation procedure, or in response to the second RRC response message.

3. The network of claim 1, wherein the instructions further comprise:
the first BS transmitting status information of at least one other PDCP SDU associated with at least one COUNT value or at least one PDCP sequence number equal to or after the first RX_DELIV, to the second BS.

4. The network of claim 3, wherein the instructions further comprise:
the second BS setting a second RX_NEXT to a COUNT value derived from the first RX_DELIV and the status information; and
the second BS using the second RX_NEXT to process the second plurality of PDCP SDUs.

5. The network of claim 1, wherein the instructions further comprise:
the second BS starting a t-Reordering timer associated to the DRB in response to the DC operation procedure, in response to a secondary node (SN) Reconfiguration Complete message received from the first BS, or when detecting a transmission from the communication device.

6. A network comprising a first base station (BS) and a second BS, comprising:
at least one storage device; and
at least one processing circuit, coupled to the at least one storage device, wherein the at least one storage device stores, and the at least one processing circuit is configured to execute instructions of:
the first BS transmitting a first radio resource control (RRC) message on a signaling radio bearer (SRB) to a communication device, wherein the first RRC message configures a data radio bearer (DRB);
the first BS receiving a first RRC response message from the communication device on the SRB, in response to the first RRC message;
the first BS receiving a first plurality of packet data convergence protocol (PDCP) Service Data Units (SDUs) associated to the DRB from the communication device;
the first BS processing the first plurality of PDCP SDUs according to a first RX_NEXT, a first RX_DELIV and a first RX_REORD which are associated to the DRB;
the first BS performing a dual connectivity (DC) operation procedure for the communication device with the second BS to modify the DRB to be a secondary cell group (SCG) bearer or a split bearer;
the first BS transmitting a second RRC message on the SRB to the communication device in response to the DC operation procedure;
the first BS receiving a second RRC response message responding to the second RRC message on the SRB from the communication device;
the first BS transmitting a COUNT value to the second BS;
the second BS determining a second RX_NEXT, a second RX_DELIV and a second RX_REORD according to the COUNT value;
the second BS receiving a second plurality of PDCP SDUs associated to the DRB from the communication device; and
the second BS processing the second plurality of PDCP SDUs according to the second RX_NEXT, the second RX_DELIV and the second RX_REORD.

7. The network of claim 6, wherein the instructions further comprise:
the first BS updating the first RX_NEXT, the first RX_DELIV and the first RX_REORD to a plurality of other values, when processing the first plurality of PDCP SDUs.

8. The network of claim 6, wherein the first BS transmits the COUNT value to the second BS in response to the DC operation procedure, or in response to the second RRC response message.

9. The network of claim 6, wherein the second BS sets the second RX_NEXT to the COUNT value, the second RX_DELIV to the COUNT value and the second RX_REORD to the COUNT value.

10. The network of claim 6, wherein the instructions further comprise:
the first BS transmitting status information of at least one other PDCP SDU; and
the second BS setting the second RX_NEXT, the second RX_DELIV and the second RX_REORD according to the COUNT value and the status information.

* * * * *